United States Patent [19]
Ruthrof

[11] 3,717,554
[45] Feb. 20, 1973

[54] DEVICE FOR RECLAIMING SWEET WATER FROM SEA WATER OR BRACKISH WATER

[75] Inventor: Klaus Ruthrof, Erlangen, Germany

[73] Assignee: Simens Aktiengesellschaft, Berlin and Munich, Germany

[22] Filed: March 27, 1970

[21] Appl. No.: 23,365

[30] Foreign Application Priority Data

March 29, 1969 Germany.....................P 19 16 337.2

[52] U.S. Cl..........................................202/238, 159/6
[51] Int. Cl.............................B01d 3/08, B01d 1/22
[58] Field of Search....................159/6; 202/236, 238

[56] References Cited

UNITED STATES PATENTS

| | | | |
|---|---|---|---|
| 2,192,089 | 2/1940 | Long | 159/6 |
| 2,292,483 | 8/1942 | Rowell | 159/6 |
| 2,350,934 | 6/1944 | Schutte | 210/63 |
| 3,204,687 | 9/1965 | Sargeant | 159/6 |
| 3,242,908 | 3/1966 | Kopczynski | 122/11 |
| 3,255,805 | 6/1966 | Bechard | 159/6 |
| 3,344,836 | 10/1967 | Kopczynski | 159/6 |
| 3,472,304 | 10/1969 | Evkin | 159/6 |
| 3,595,298 | 7/1971 | Enders | 159/6 |

Primary Examiner—Norman Yudkoff
Assistant Examiner—J. Sofer
Attorney—Curt M. Avery, Arthur E. Wilfond, Herbert L. Lerner and Daniel J. Tick

[57] ABSTRACT

Device for reclaiming potable water from non-potable water such as sea water or brackish water wherein the non-potable water is heated and fed into a centrifugal force field so that vaporization, due to low pressure occurring in a condenser located downstream of the centrifugal force field, takes place at the inner surface of a water ring formed by the centrifugal force field, includes an outer stationary chamber and an inner rotatably driven and rotationally symmetrical chamber, axial feeding means for non-potable water in one of the end faces of the inner chamber, axial discharge means in the end face of the inner chamber opposite the one end face thereof for gaseous medium produced in the inner chamber, the inner chamber having a casing formed with outlet openings for the water concentrated with residues, the inner and outer chambers defining an intermediate space therebetween for receiving the residue-concentrated water through the outlet openings, and an outlet line connected to the intermediate space for discharging the residue-concentrated water therefrom.

3 Claims, 3 Drawing Figures

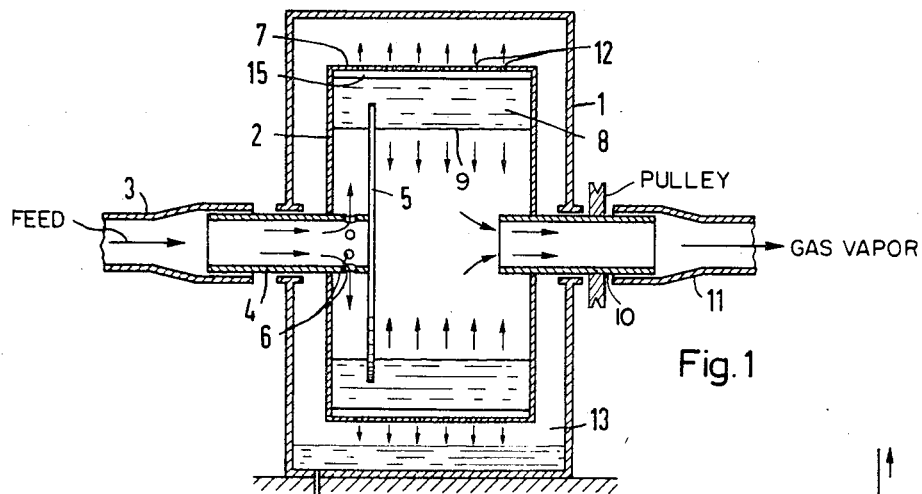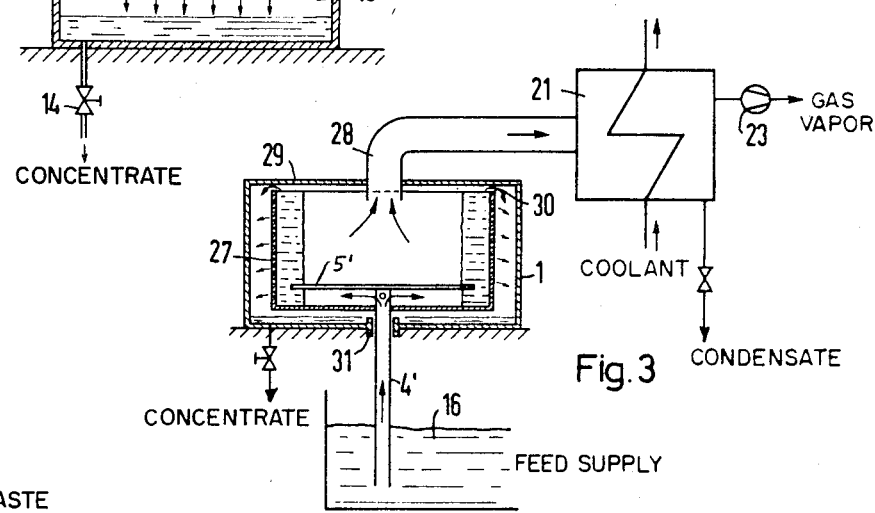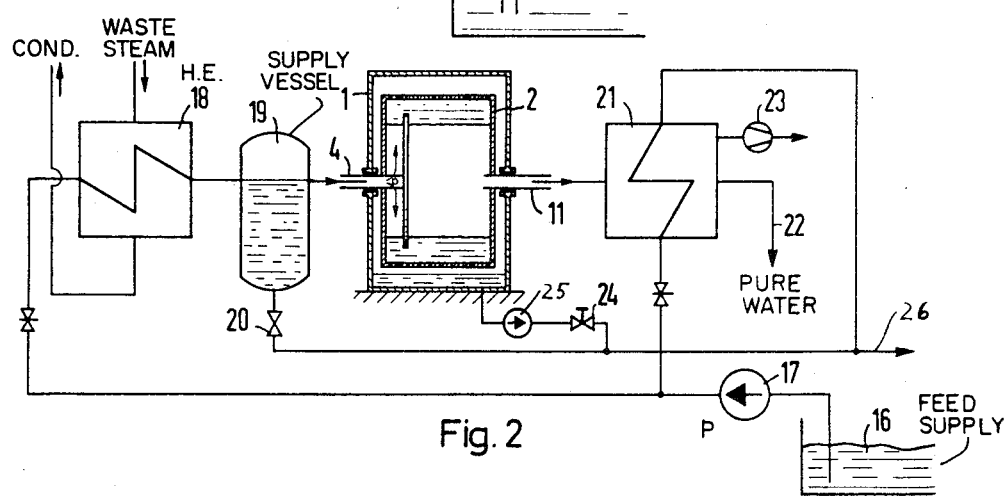

3,717,554

DEVICE FOR RECLAIMING SWEET WATER FROM SEA WATER OR BRACKISH WATER

My invention relates to device for reclaiming potable or sweet water from non-potable water such as sea water or brackish water.

In my application Ser. No. 850,954, filed Aug. 18, 1969, now abandoned, which is assigned to the same assignee as that of the instant application, there are disclosed a method and device for reclaiming sweet water from sea or brackish water wherein the sea or brackish water is heated and is passed into a centrifugal force field so that vaporization, due to low pressure occurring in a condenser located downstream of the centrifugal force field, takes place at the inner surface of the water ring that is formed.

The device for reclaiming the sweet water is formed of a stationary rotationally symmetrical chamber into which the sea water is tangentially introduced. The sea water vaporizes at the inner surface of the water ring forming in the chamber.

This known device, however, requires a relatively high expenditure of energy, whereby the installation must be operated only continuously.

It is an object of my invention to provide device for reclaiming potable water from non-potable water wherein the energy expenditure is smaller than for the heretofore known devices of this general type and wherein, furthermore, a continuous as well as intermittent operation is afforded.

With the foregoing and other objects in view, I provide, in accordance with my invention device for reclaiming potable water from non-potable water such as sea water or brackish water wherein the non-potable water is heated and fed into a centrifugal force field so that vaporization, due to low pressure occurring in a condenser located downstream of the centrifugal force field, takes place at the inner surface of a water ring formed by the centrifugal force field, comprising an outer stationary chamber and an inner rotatably driven and rotationally symmetrical chamber, axial feeding means for non-potable water in one of the end faces of the inner chamber, axial discharge means in the end face of the inner chamber opposite the one end face thereof for gaseous medium produced in the inner chamber, the inner chamber having a casing formed with outlet openings for the water concentrated with residues, the inner and outer chambers defining an intermediate space therebetween for receiving the residue-concentrated water through the outlet openings, and an outlet line connected to the intermediate space for discharging the residue-concentrated water therefrom.

In accordance with another feature of the invention for supplying the non-potable water, I provide a supply tube extending into the inner chamber and having the end thereof projecting into the chamber closed by a circular guide plate of greater diameter than that of the supply tube, the supply tube having lateral outlet openings in the vicinity of the inner chamber for discharging the non-potable water therefrom. The non-potable water preheated in a heat exchanger is thus introduced through the immersion tube into the inner rotating chamber and is pressed by the centrifugal force at the inner wall of the chamber casing. Due to the low or negative pressure occurring in the condenser connected downstream form the rotating inner chamber, vaporization of the non-potable water occurs at the inner surface of a water ring formed in the inner rotating chamber whereby, for suitable low condenser pressures, vaporization is possible even for temperatures below 100°C.

In accordance with another feature of the invention wherein the potable water reclaiming device of my invention has a vertical orientation, the inner chamber is formed as a vessel open above and having such a length that a gap is provided between the upper edge of the vessel and the top of the outer chamber for ejecting remainder water from the inner chamber into the outer chamber therethrough. In addition, outlet openings can be provided at the rotating cylindrical surface of the inner chamber for additionally ejecting remainder water therefrom.

In order to prevent the formation of water layers with different rotary speeds in the inner chamber, there is provided, in accordance with yet another feature of the invention, axially parallel profile members on the inner wall of the inner chamber casing.

Other features which are considered as characteristic for the invention are set forth in the appended claims.

Although the invention is illustrated and described herein as embodied in device for reclaiming sweet water from sea water or brackish water, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a longitudinal sectional view of a horizontally oriented centrifugal force chamber in accordance with my invention;

FIG. 2 is a principal circuit diagram of a complete installation for reclaiming potable water according to the invention; and FIG. 3 is a longitudinal sectional view of a vertically oriented centrifugal force chamber in accordance with the invention.

Referring now to the drawing and first, particularly to FIG. 1 thereof, the sweet water or potable water reclaiming device of my invention is formed of an outer, stationary chamber 1 wherein there is disposed a rotationally symmetrical vaporizing chamber 2 which is rotatable by a non-illustrated drive. Heated nonpotable water, such as sea water or brackish water, is initially conducted through the line 3 into a rotary supply tube 4 which is firmly connected to the inner chamber 2. At the inner end of the supply tube 4, there is disposed a guide plate 5 which closes the supply tube 4 and which has a greater diameter than that of the supply tube 4 so that it extends into a liquid ring 8 produced by rotation of the chamber 2. The non-potable water is ejected through openings 6 formed in the supply tube 4 into the centrifugal force chamber 2 and is hurled by the centrifugal force, that is produced, against the wall 7 of the centrifugal force chamber 2 which is cylindrical in the embodiment of FIG. 1. Due to the centrifugal force field there is formed, as aforementioned, a water ring 8, on the inner surface 9 of which the non-potable water, vaporizes. The resulting vapor passes outwardly through a further tube 10, which is firmly connected to the inner centrifugal force chamber 2, into a discharge tube 11 and to a condenser not shown in FIG. 1. Due to the low or negative pressure present in the condenser, with which the centrifugal force field must maintain equilibrium, and due to the action of an evacuating pump connected downstream of the centrifugal force field, vaporization of the non-potable water in accordance with the respective existing low pressure and the vaporizing temperature corresponding thereto, is possible.

In the chamber wall or casing 7, openings 12 are furthermore provided through which the remainder water concentrated with salts, flows into an intermediate space 13 located between the outer chamber 1 and the inner chamber 2, and can be discharged through an outlet 14. The openings 12 in the chamber wall 7 should be only so large that they do not become clogged by the salt crystals that are formed.

In order to prevent the development of water layers with varying rotary speed, it is advantageous to provide the inner surface of the chamber wall 12 with longitudinal profiles 15, by means of which the water is entrained as the inner chamber 2 rotates.

With such a device, both a continuous as well as an intermittent operation is possible, whereby, after filling the inner chamber 2, the feed can be cut off until all the water is vaporized.

In FIG. 2 there is shown a schematic circuit diagram of the entire installation of a device for reclaiming potable water from non-potable water. Brackish or sea water is supplied from the water basin 16 through a pump 17 to a heat exchanger 18 wherein the non-potable water is preheated to a desired temperature. It is possible also to employ the exhaust steam heat of a steam power plant or the heated cooling water of a turbine condenser as the source of heat for the device of my invention. The non-potable water then flows into a supply vessel 19 wherein a constant water level is adjustably maintained. The respective throughput quantity or flow rate of the water through the centrifugal force vaporizer proper of the invention, shown partly in section in FIG. 2, is controlled by a valve 20 at the lower outlet, as seen in FIG. 2, of the supply vessel 19. The water being purified then flows through the supply tube 4, as shown in FIG. 1, into the inner centrifugal force chamber 2 wherein it is vaporized. The escaping vapor is then conducted through a line 11 into a condenser 21 wherein the vapor is condensed and wherein a low or negative pressure with respect to the pressure in the centrifugal force chamber 2 is maintained. It is possible in a relatively simplified manner to employ a branch flow of the non-potable water as cooling water for the condenser 21. The sweet or potable water is then drawn from the condenser 21 through a line 22. A vacuum pump 23 is additionally connected to the condenser 21 and has the function of maintaining boiling pressure in the centrifugal force chamber 2 by the fact that it draws off the gas contained in the water.

The remainder water accumulating in the intermediate space 13 between the outer chamber 1 and the inner chamber 2 of the centrifugal force vaporizer proper is fed through a valve 24 and a pressure-increasing pump 25 to a discharge line 26 for excess non-potable water.

In FIG. 3 there is shown a sweet water reclaiming device that is vertically oriented in accordance with another embodiment of my invention. The outer stationary chamber 1 contains an inner vessel 27, open at the top thereof, into which sea or brackish water, is supplied through a supply tube 4' from below. A guide plate 5', also in this embodiment, prevents the direct passage of the inflowing non-potable water into the vapor-removing channel 28. The centrifugal force vessel 27 is open at the top thereof and the cylindrical outer wall of the vessel 27 is only so high that an annular gap 30 remains between the upper edge of the vessel 27 and the top or cover 29 of the outer chamber 1, which permits the remainder water released by the centrifugal force to flow out. The vessel wall 27 is also provided with openings to permit the discharge of remainder water with concentrated salts.

The advantage of this vertically disposed embodiment of FIG. 3 over the horizontally disposed embodiment of the centrifugal flow chamber of FIGS. 1 and 2 is that only on lower bearing 31 is provided which must have a vacuum-tight construction or is provided with a water control or check lock. The upper vapor discharge line 28 of the embodiment of FIG. 3 terminates, on the other hand, in a cover 29 of the outer chamber 1, so that no sealing is required therefor.

I claim:

1. Device for reclaiming potable water from non-potable water such as sea water or brackish water wherein the non-potable water is heated and fed into a centrifugal force field so that vaporization, due to low pressure occurring in a condenser located downstream of the centrifugal force field, takes place at the inner surface of a water ring formed by the centrifugal force field, comprising an outer stationary chamber and an inner rotatably driven and rotationally symmetrical chamber having transverse disc-shaped walls at the ends thereof formed with respective end faces, axial feeding means for non-potable water in one of the end faces of said inner chamber, axial discharge means in the end face of said inner chamber opposite said one end face thereof for discharging from said inner chamber gaseous medium produced by vaporization in said inner chamber, said inner chamber being a casing having a cylindrical wall formed with outlet openings for the water concentrated with residues, said inner and outer chambers defining an intermediate space therebetween for receiving the residue-concentrated water through said outlet openings, and an outlet line communicating with said intermediate space for discharging the residue-concentrated water therefrom, said axial feeding means comprising a supply tube having an end thereof extending into said inner chamber for supplying non-potable water thereto, a transverse circular guide plate having a greater diameter than that of said supply tube closing said end of said supply tube, said supply tube having lateral outlet openings formed therein in the region of said inner chamber for discharging the non-potable water therefrom.

2. Device for reclaiming potable water from non-potable water such as sea water or brackish water wherein the non-potable water is heated and fed into a centrifugal force field so that vaporization, due to low pressure occurring in a condenser located downstream of the centrifugal force field, takes place at the inner surface of a water ring formed by the centrifugal force field, comprising an outer stationary chamber and an inner rotatably driven and rotationally symmetrical chamber having a transverse disc-shaped wall at one end thereof and being open at its other end, axial feeding means for non-potable water in said transverse wall, axial discharge means in the end wall of said outer chamber opposite said one end for discharging from said inner an outer chamber gaseous medium produced by vaporization in said inner chamber, said inner chamber being a casing having a cylindrical wall formed with outlet openings for the water concentrated with residues, said inner and outer chambers defining an intermediate space therebetween for receiving the residue-concentrated water through said outlet openings, and an outlet line communicating with said intermediate space for discharging the residue-concentrated water therefrom, said inner chamber being formed as a vessel of such length that an overflow gap is defined between the open edge of said vessel and the other end of said outer chamber for ejecting remaining water from said inner chamber into said outer chamber therethrough.

3. Device according to claim 1 including parallel profile members respectively extending axially on said inner wall of said inner chamber and lying in radial planes.

* * * * *